J. H. BROOKE.
Pattern for Garments.
No. 216,257. Patented June 10, 1879.
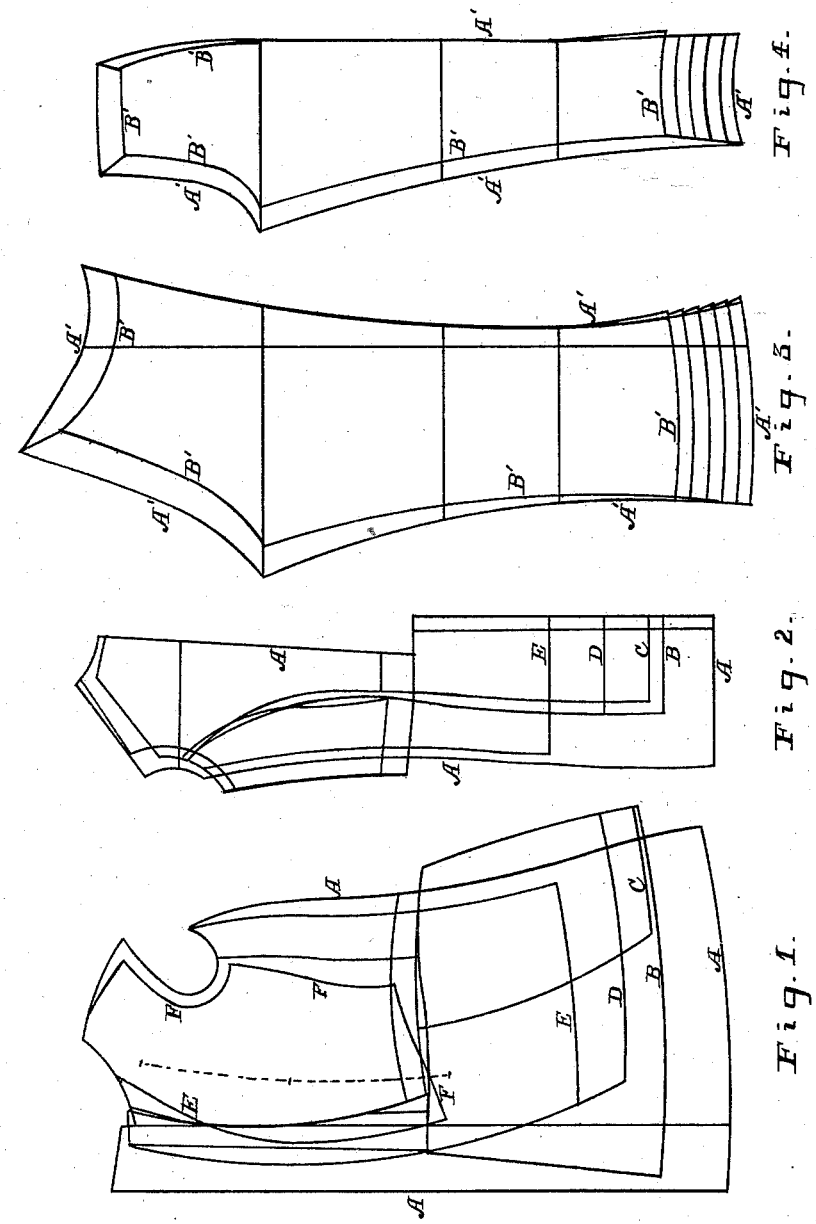

UNITED STATES PATENT OFFICE.

JOHN H. BROOKE, OF CINCINNATI, OHIO.

IMPROVEMENT IN PATTERNS FOR GARMENTS.

Specification forming part of Letters Patent No. 216,257, dated June 10, 1879; application filed February 4, 1879.

*To all whom it may concern:*

Be it known that I, JOHN H. BROOKE, of Cincinnati, in the county of Hamilton and State of Ohio, have invented a new and useful Improvement in Combination and Transformation Patterns, which improvement is fully set forth in the following specification and accompanying drawing, in which—

Figure 1 is a view of the patterns for the front of coats; Fig. 2, the backs of same; Fig. 3, the patterns for front of pants, and Fig. 4 the backs of same.

The object of my invention is to form a pattern or patterns for all styles and classes of men's and boys' garments, so arranged that, instead of having innumerable patterns on separate sheets for each style that may be made, only three different sheets or patterns will be required, and these are formed with special reference to producing a uniform class of garments in an artistic manner without the use of the old method of drafting by rule, thus saving greatly in time and labor, and obviating the many and costly mistakes made by inexperienced workman in cutting garments.

I shall first point out the different patterns on the accompanying drawings by means of the letters of reference.

In Figs. 1 and 2, the lines A represent the form of the combination-patterns for an overcoat, these lines being also the limit of the patterns themselves. Lines B represent the pattern for the Prince Albert style marked upon the patterns A; C, the patterns for the dress-coat; D, for cutaway; E, for sack-coat; F, for vest.

In like manner, in Figs. 3 and 4, the lines A' show the size of the patterns for pants, and B' drafted on the pattern for other styles and sizes. This one combination of pants is a fac-simile of five combinations of the same kind, from leg-measure of nine and one-half inches to thirty-six inches, and from waist-measure of twenty-three up to fifty inches, including every size from the smallest boy to the largest man.

The drawing of the coat and vest combination is a representation of twenty-nine of the same kind, from a boy of twenty inches to a man of forty-eight inches, breast-measure. With this combination I can form and produce any shape or style of coat, vest, or pants now manufactured.

The special feature of my invention is as follows:

I produce three sizes for men, from thirty-three to forty-eight inches, breast-measure. For instance, thirty-six inches to fit a man five feet four inches high; thirty-six to fit a man five feet eight inches; thirty-six to fit a man six feet high; and thus all the way through from thirty-three to forty-eight inches.

Each style being represented on the combination-sheet, a novice can readily follow the line, after having selected a size and style that fits his customer, and cut the goods without fear of making mistakes, as is usually the case by the slow and laborious method of drafting each separate garment by rule.

I also effect a saving in the cost of patterns by having the combination of the styles and sizes on one sheet, and greatly simplify the method of producing stylish garments.

I am aware that Letters Patent No. 126,825 shows different sizes and also styles of ladies' plain and full-waist sacques and half-sacques; but it will be seen that said patent provides only for a chart having a scale of figures and perforations so arranged as to mark off the said styles and sizes from the various points or junctions of the angles, and that the curves between these points must necessarily be left to the judgment of the cutter. This is obviated by having a sheet upon which the different styles and sizes are marked in full, which dispenses with the graduated scale and enables the cutter to select a size or style on the sheet without referring to the scale of figures and perforations at each juncture of the angles. As pointed out in said Letters Patent, the chart therein described is intended only for ladies' waists, sacques, and basques, whereas my invention has special reference to patterns for boys' and men's coats, pants, and vests.

I do not claim, broadly, the method of making a chart upon which different styles and sizes are marked.

What I claim as new in my invention is—

The combination, on one and the same pattern-sheet, of patterns of different styles and sizes of garments, as a coat, vest, or pants, forming a complete set of patterns in themselves, substantially as described and shown, whereby garments can be cut without the aid of rule, scale, or other measuring device, as hereinbefore set forth.

JOHN H. BROOKE.

Witnesses:
J. S. ZERBE,
JOHN A. HUGHES.